(12) United States Patent
Hisada

(10) Patent No.: US 9,384,752 B2
(45) Date of Patent: Jul. 5, 2016

(54) AUDIO DEVICE AND STORAGE MEDIUM

(71) Applicant: Alpine Electronics, Inc., Tokyo (JP)

(72) Inventor: Seiichi Hisada, Iwaki (JP)

(73) Assignee: Alpine Electronics Inc., Tokyo (JP)

( * ) Notice: Subject to any disclaimer, the term of this patent is extended or adjusted under 35 U.S.C. 154(b) by 349 days.

(21) Appl. No.: 14/078,786

(22) Filed: Nov. 13, 2013

(65) Prior Publication Data

US 2014/0188483 A1 Jul. 3, 2014

(30) Foreign Application Priority Data

Dec. 28, 2012 (JP) ................................. 2012-286576

(51) Int. Cl.
*G10L 15/22* (2006.01)
*G10L 21/00* (2013.01)
*G06F 3/16* (2006.01)

(52) U.S. Cl.
CPC ................ *G10L 21/00* (2013.01); *G06F 3/165* (2013.01); *G10L 2015/223* (2013.01)

(58) Field of Classification Search
USPC .............................................. 704/270.1, 275
See application file for complete search history.

(56) References Cited

U.S. PATENT DOCUMENTS

| 6,192,340 B1* | 2/2001 | Abecassis | G10H 1/0058 455/185.1 |
| 2002/0010589 A1* | 1/2002 | Nashida | G06F 3/16 704/275 |
| 2004/0054539 A1* | 3/2004 | Simpson | G10L 15/30 704/270.1 |
| 2007/0291404 A1* | 12/2007 | Morse | G11B 27/105 360/81 |
| 2008/0156173 A1* | 7/2008 | Bauer | G06F 17/30026 84/601 |
| 2008/0287063 A1* | 11/2008 | Kidron | G10L 19/167 455/41.2 |
| 2009/0099836 A1* | 4/2009 | Jacobsen | G06F 17/289 704/3 |
| 2009/0204410 A1* | 8/2009 | Mozer | G10L 15/30 704/275 |
| 2009/0234655 A1* | 9/2009 | Kwon | 704/270.1 |
| 2010/0191535 A1* | 7/2010 | Berry | H04M 3/4936 704/275 |

FOREIGN PATENT DOCUMENTS

| JP | 2002-175685 | 6/2002 |
| JP | 2005-085433 | 3/2005 |
| JP | 2006-048867 | 2/2006 |

* cited by examiner

*Primary Examiner* — Abul Azad
(74) *Attorney, Agent, or Firm* — Brinks Gilson & Lione

(57) ABSTRACT

An audio device transfers voice data which requests playback, generated by a user to a portable player. The portable player performs voice recognition of the transferred voice data. Control for playback start is started in accordance with the content as the result of the voice recognition. The audio device starts monitoring for a playback state of the portable player. If the start of the playback operation is detected within a predetermined period, an output source of sound to be output is changed to the portable player.

14 Claims, 3 Drawing Sheets

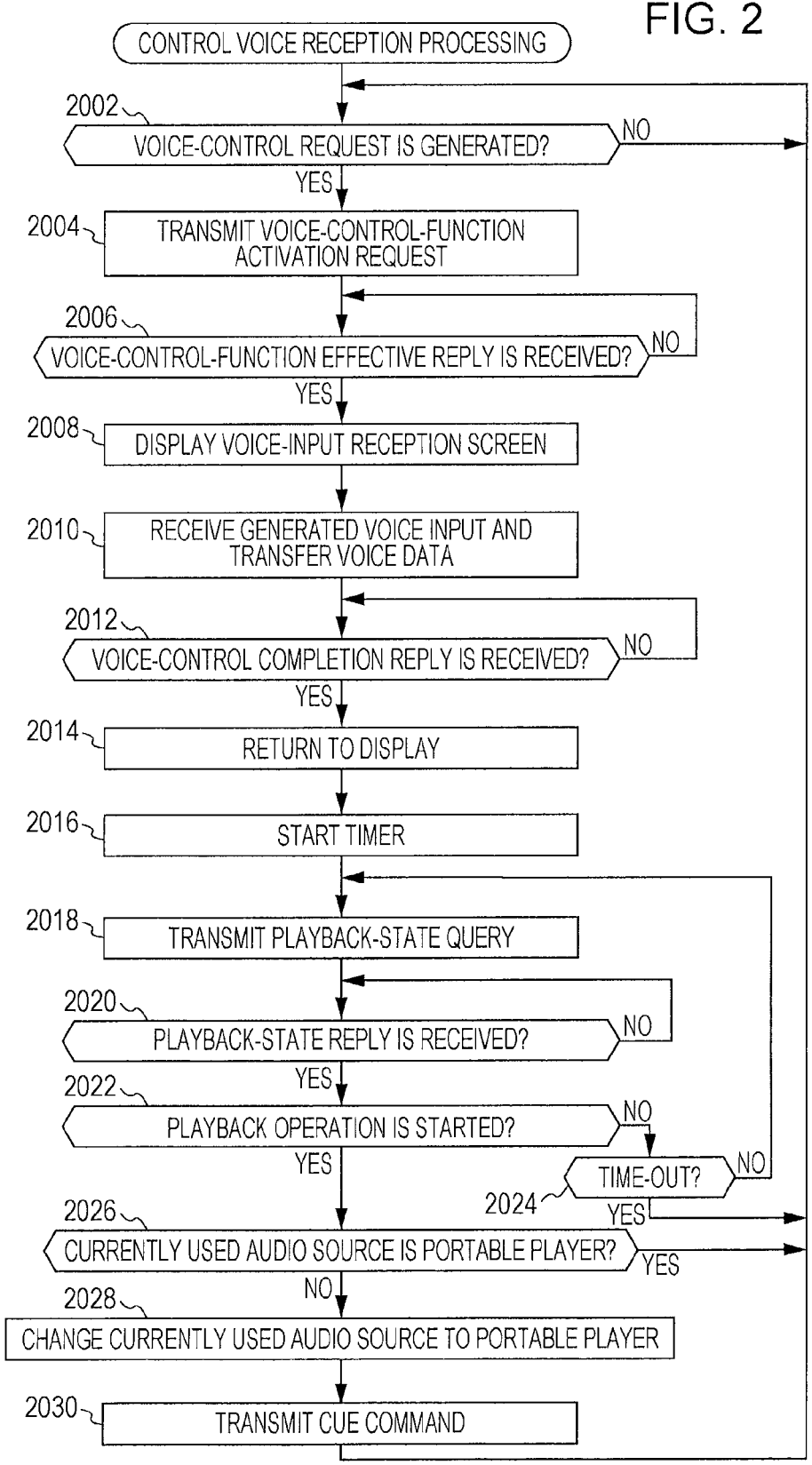

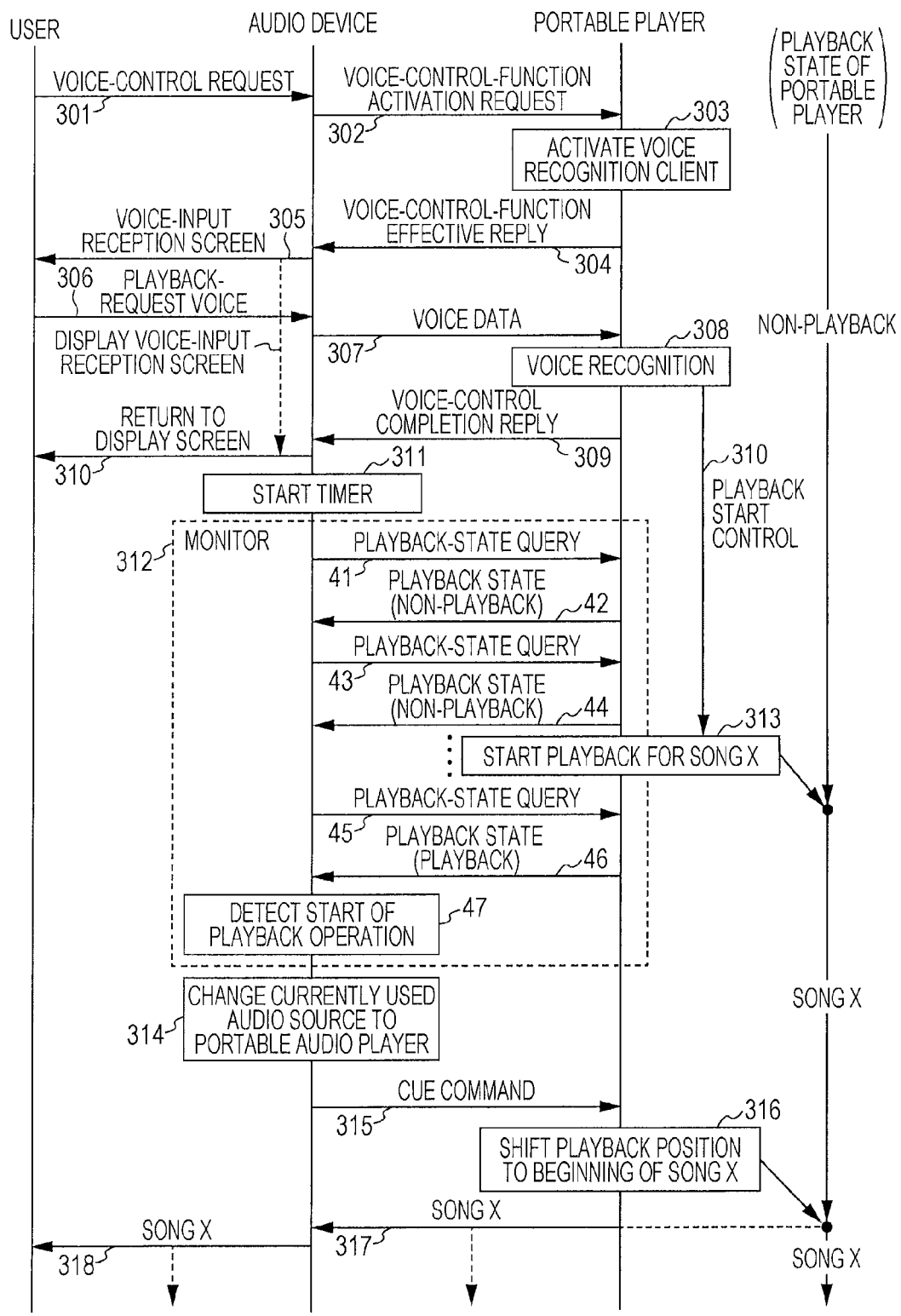

AUDIO DEVICE AND STORAGE MEDIUM

RELATED APPLICATION

The present application claims priority to Japanese Patent Application Number 2012-286576, filed Dec. 28, 2012, the entirety of which is hereby incorporated by reference.

BACKGROUND

1. Field of the Invention

The present invention relates to a technology of controlling an output operation for playback sound of a portable player of an audio device in which the portable player can be installed as one of plural audio sources.

2. Description of the Related Art

As an audio device in which a portable player can be installed as one of plural audio sources, there is known an audio device that includes a display device, an input device, and an audio output unit such as a speaker or an audio amplifier, receives an operation of the connected portable player from a user through a user interface using the display device and the input device, controls a playback operation of the portable player, and outputs playback sound input from the connected portable player through the audio output unit (for example, Japanese Unexamined Patent Application Publication No. 2002-175685, Japanese Unexamined Patent Application Publication No. 2006-48867).

Also, as a technology of controlling a playback operation of an audio device that performs a playback output of a song, there is known a technology of voice control that recognizes voice generated by a user and controls a playback operation of an audio device in accordance with the content as a result of voice recognition (for example, Japanese Unexamined Patent Application Publication No. 2005-85433).

In the above-described audio device in which the portable player can be installed as one of the audio sources, if the connected portable player is controllable by voice generated by the user, the generated voice of the user received by a microphone included in the audio device may be transferred to the portable player and hence the portable player may be controlled by the voice control.

However, in this case, since the audio device cannot recognize the content of control made on the portable player by voice control, the audio device cannot perform an operation that matches the control content of the portable player by the voice control.

That is, for example, when the audio device outputs sound of an audio source (for example, radio) other than the portable player, if the user performs voice control that causes the portable player to start a playback operation, it is proper to perform an operation of changing the sound to be output to sound that is output by the portable player. However, the audio device cannot recognize whether the content of voice control is control of starting a playback operation of the portable player or control of some other operation not relating to the playback operation. Thus, the audio device cannot perform a proper operation.

SUMMARY

Accordingly, an object of embodiments of the present invention is to allow an audio device, which transfers received generated voice of a user to a portable player and performs voice control of the portable player, to perform an operation that matches the control content by the voice control of the portable player.

To attain the object, an embodiment of the present invention provides an audio device and a portable player that is connectable to the audio device, the portable player being controllable by voice control. The audio device includes a sound output unit that outputs sound, the sound source of which is a currently used audio source; a source selection unit that selectively sets one of a plurality of audio source devices as the currently used audio source; a microphone; and a control voice processing unit. If the portable player is connected, the source selection unit causes the portable player to be included in the plurality of audio source devices as one of the audio source devices, and selectively sets one of the plurality of audio source devices including the portable player as the currently used audio source. If the portable player is set as the currently used audio source, the sound output unit outputs sound to be transferred to the audio device from the portable player. The control voice processing unit, if the portable player is connected, transfers voice data of generated voice input from the microphone to the portable player, and causes the portable player to perform voice control by the voice of the voice data transferred to the portable player. Also, the control voice processing unit acquires a state of the portable player after the voice control is performed from the portable player, and causes the source selection unit to set the portable player as the currently used audio source in accordance with the acquired state.

With such an audio device, to be specific, the control voice processing unit may acquire a playback state of the portable player as the state after the voice control is performed from the portable player, determine whether or not a playback operation of the portable player is started by the voice control, and if the playback operation of the portable player is started, cause the source selection unit to set the portable player as the currently used audio source.

Also, the control voice processing unit may determine that the playback operation of the portable player is started by the voice control if the playback operation of the portable player is started within a predetermined period after the control voice processing unit causes the portable player to perform the voice control.

Also, the control voice processing unit may determine that the playback operation of the portable player is started by the voice control if the playback state of the portable player is changed from non-playback to playback within a predetermined period after the control voice processing unit causes the portable player to perform the voice control.

The control voice processing unit may control start of playback of the portable player from the beginning of an audio content during playback by the portable player, if the playback operation of the portable player is started by the voice control. Alternatively, the control voice processing unit may control the portable player to start playback of an audio content during playback by the portable player from a playback time position which is shifted by a predetermined time toward the beginning from a current playback time position of the audio content, if the playback operation of the portable player is started by the voice control.

With the above-described audio device, the state of the portable player after the voice control is performed is acquired from the portable player, and the portable player can be set as the currently used audio source in accordance with the acquired state. Accordingly, in the audio device, a change operation of the currently used audio source to the portable player, the operation of which matches the control content of the voice control performed by the portable player, can be performed.

For example, in the audio device, the playback state of the portable player is acquired from the portable player as the state after the voice control is performed, it is determined whether or not the playback operation of the portable player is performed by the voice control, and the source selection unit sets the portable player as the currently used audio source if the playback operation of the portable player is started. Accordingly, when the user performs voice control for the start of the playback operation on the portable player through the audio device, the sound to be output can be automatically changed to the sound that is output by the portable player.

The above-described configuration of the audio device may be similarly applied to a content output device that outputs a content such as video content instead of sound.

As described above, in the audio device in which the received generated voice of the user is transferred to the portable player and hence the voice control of the portable player is performed, the operation that matches the control content of the voice control of the portable player can be performed.

BRIEF DESCRIPTION OF THE DRAWINGS

FIG. 2 is a flowchart showing control voice reception processing according to the embodiment of the invention; and FIG. 3 is a sequence diagram showing an operation example of an audio system according to the embodiment of the invention.

DESCRIPTION OF THE PREFERRED EMBODIMENTS

Figure 1:
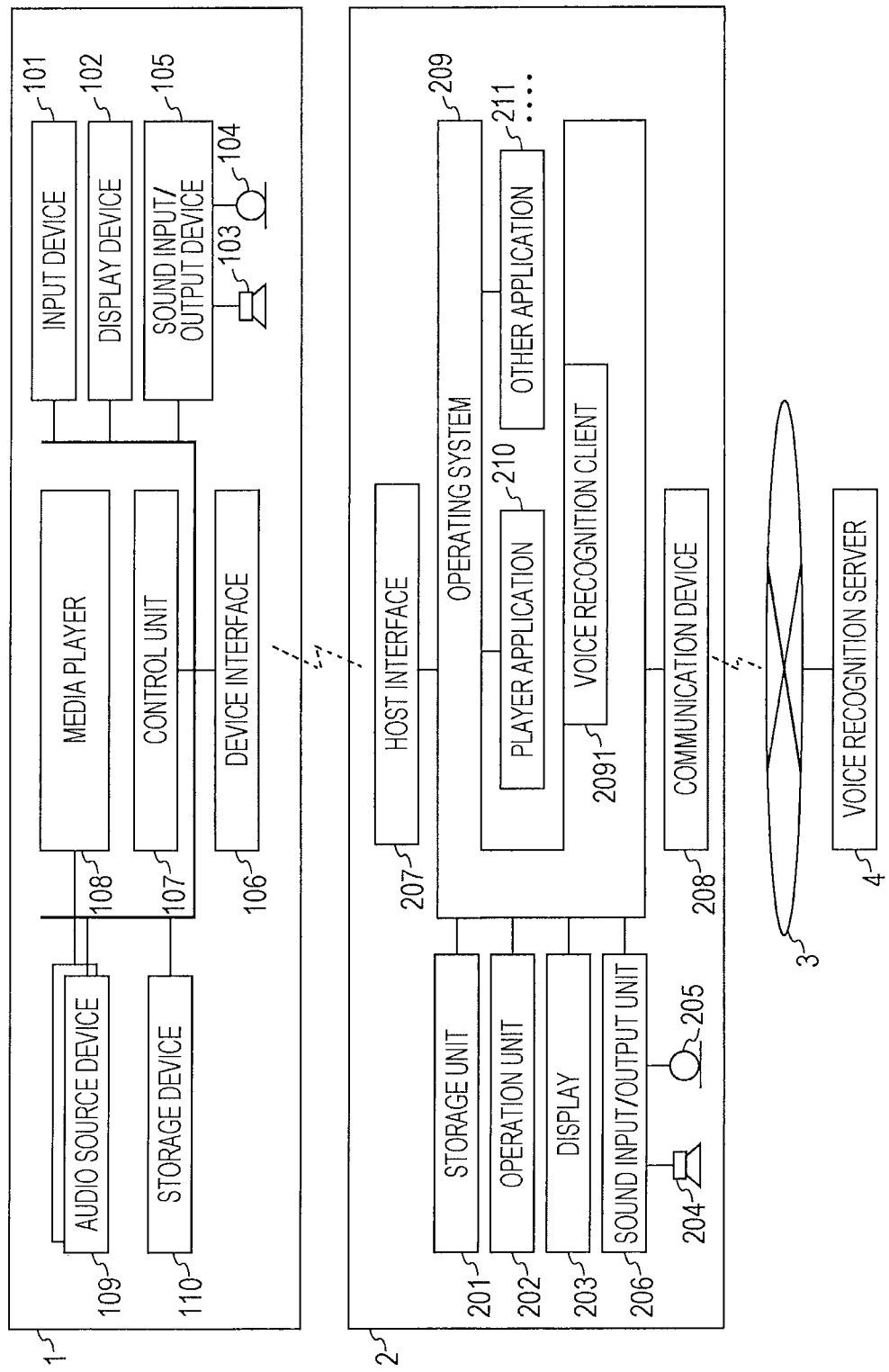
FIG. 1 is a block diagram showing a configuration of an audio system according to an embodiment of the invention.

An embodiment of the invention is described below.

FIG. 1 shows a configuration of an audio system according to this embodiment. As illustrated, the audio system includes an audio device 1 and a portable player 2 connectable to the audio device 1.

The audio device 1 is, for example, a device mounted in a vehicle. As illustrated, the audio device 1 includes an input device 101, a display device 102, a microphone 103, a speaker 104, a sound input/output device 105 that performs inputting of voice by using the microphone 103 and outputting of sound to the speaker 104, a device interface 106 that is an interface used for connection with the portable player 2, a control unit 107, a media player 108, a plurality of audio source devices 109, and a storage device 110.

The audio source devices 109 may include a device that outputs sound, such as a radio receiver, a device that plays back and outputs audio data recorded in a recording disk, such as a compact disk (CD) or a digital versatile disk (DVD), and/or a device such as a memory card having audio data recorded therein.

The control unit 107 displays a menu screen on the display device 102. The menu screen receives a source change operation etc. in accordance with a user's operation through the input device 101. In accordance with the source change operation of the user received by the menu screen, the control unit 107 selectively sets one of the audio source devices 109 or the connected portable player 2 as a currently used audio source. Alternatively, audio data may be stored in the storage device 110, and the storage device 110 may be set as the currently used audio source.

If the control unit 107 sets the audio source device 109 that outputs sound as the currently used audio source, the media player 108 outputs sound output from the audio source device 109 to the speaker 104 through the sound input/output device 105. If the control unit 107 sets an audio source device 109 that outputs audio data as the currently used audio source, the media player 108 plays back audio data output from the audio source device 109 and outputs the playback sound to the speaker 104 through the sound input/output device 105. If the control unit 107 sets an audio source device 109 having recorded therein audio data as the currently used audio source, the media player 108 reads the audio data recorded in the audio source device 109, plays back the read audio data, and outputs the playback sound to the speaker 104 through the sound input/output device 105. Also, if the control unit 107 sets the portable player 2 as the currently used audio source, the media player 108 outputs the sound of the audio data received from the portable player 2 through the device interface 106 to the speaker 104 through the sound input/output device 105.

The control unit 107 displays a graphical user interface (GUI) screen on the display device 102. The GUI screen is for displaying a playback state of the audio source device 109 or the portable player 2 set as the currently used audio source, and receiving a control operation for a playback operation of the device set as the currently used audio source. The control unit 107 controls various operations of the audio source device 109 or the portable player 2 in accordance with a user operation received by the GUI screen, and playback and output operations of audio data or sound of the media player 108. The control unit 107 performs control for various operations of the portable player 2 through the device interface 106.

The audio device 1 may use a computer including a central processing unit (CPU) and a memory in terms of hardware. In this case, the control unit 107 and the media player 108 are provided when the computer executes predetermined computer programs.

The portable player 2 is a mobile device carried by the user. As illustrated, the portable player 2 includes a storage unit 201, an operation unit 202, a display 203, a microphone 204, a speaker 205, a sound input/output unit 206 that inputs voice by using the microphone 204 and outputs sound to the speaker 205, a host interface 207 that is an interface used for connection with the audio device 1, a communication device 208, and an operating system 209 that is an OS of the portable player 2.

Also, the portable player 2 includes a player application 210 and other applications 211 as applications that are administered by the operating system 209 and operate on the operating system 209.

The storage unit 201 of the portable player 2 stores an audio file storing audio data of a song. If the portable player 2 is not connected to the audio device 1, the player application 210 receives control by a user's operation on the user interface by using the display 203 and the operation unit 202 through the operating system, and, for example, plays back the audio data of the audio file stored in the storage device 110. Also, if the portable player 2 is not connected to the audio device 1, the sound expressed by the audio data of the audio file stored in the storage device 110 is output from the speaker 205 through the sound input/output unit 206.

In contrast, if the portable player 2 is connected to the audio device 1, the portable player 2 receives control from the audio device 1 through the host interface 207 and the operating system 209, and, for example, plays back the audio data of the audio file stored in the storage device 110. Also, if the portable player 2 is connected to the audio device 1, the audio data played back from the audio file stored in the storage device 110 is transmitted to the audio device 1 through the host interface 207. As described above, if the portable player 2 is set as the above-described currently used audio source, the media player 108 of the audio device 1 outputs the sound of the audio data transmitted from the portable player 2 to the audio device 1 to the speaker 104 through the sound input/output device 105.

The operating system 209 includes a voice recognition client 2091 that receives a voice input. The operating system 209 activates the voice recognition client 2091 when the operating system 209 receives a voice-control request from the user through the operation unit 202. The operating system 209 passes voice data of generated voice of the user input from the microphone 204 as input voice data to the voice recognition client 2091. The voice recognition client 2091 is connected to a voice recognition server 4 on a wide area network (WAN) 3 such as the Internet through the communication device 208, and transmits a voice recognition request accompanying the passed input voice data to the voice recognition server 4. When the voice recognition server 4 receives the voice recognition request, it performs voice recognition for the input voice data accompanying the voice recognition request and replies to the voice recognition client 2091 about the voice recognition result. Then, the voice recognition client 2091, which has received the reply of the voice recognition result, replies to the operating system about a voice-control completion reply, and controls an operation of an application corresponding to the voice recognition result through the operating system 209. The control for the operation of the application corresponding to the voice recognition result contains control for a playback operation of an audio file stored in the storage unit 201 of the player application 210.

The communication device 208 may be a wireless local-area network (LAN) interface for connection with a wireless LAN or a mobile communication device for connection with a mobile communication network. If the portable player 2 is a smart phone having a mobile phone function, the communication device 208 is the mobile communication device, and the portable player 2 includes a mobile phone application for providing the mobile phone function by using the mobile communication device, the sound input/output unit 206, and the operation unit 202, as the above-described other application 211.

Also, the operating system 209 may include a voice recognition engine that receives a voice input by solely performing voice recognition, instead of the voice recognition client 2091.

The host interface 207 of the portable player 2 and the device interface 106 of the audio device 1 perform intercommunication through wireless connection by using a wireless communication interface, such as Bluetooth (registered trademark) or Wireless Fidelity (Wi-Fi).

With this configuration, control voice reception processing performed by control unit 107 of the audio device 1 while the portable player 2 is connected to the audio device 1 is described below.

FIG. 2 shows the procedure of the control voice reception processing. As illustrated, in this processing, the control unit 107 monitors generation of a voice-control request operation by the user to the input device 101 (step 2002). If the voice-control request operation is generated, the control unit 107 transmits a voice-control-function activation request to the portable player 2 through the device interface 106 (step 2004).

The operating system 209 of the portable player 2, which has received the voice-control-function activation request through the host interface 207, activates the voice recognition client 2091. If the activation is completed, the operating system 209 replies to the audio device 1 with a voice-control-function effective reply.

Then, the control unit 107 monitors reception of the voice-control-function effective reply (step 2006). If the control unit 107 has received the voice-control-function effective reply, the control unit 107 displays a predetermined voice-input reception screen (step 2008), and urges the user to generate voice.

The voice-input reception screen may be displayed by displaying a screen prepared as the voice-input reception screen. If the portable player 2 outputs the voice-input reception screen to the audio device 1 through the host interface 207 while the voice recognition client 2091 is operated, the voice-input reception screen may be displayed by displaying the voice-input reception screen output from the portable player 2.

Then, the control unit 107 receives the input of the generated voice from the user through the microphone 103 and the sound input/output device, and transmits voice data of the received generated voice to the portable player 2 through the device interface 106 (step 2010).

At this time, the operating system 209 of the portable player 2, which has received the transfer of the voice data from the audio device 1, passes the audio data transferred as the above-described input voice data to the voice recognition client 2091. The voice recognition client 2091 performs voice recognition for the above-described input voice data and the control for the operation of the application corresponding to the voice recognition result through the operating system 209. The voice recognition client 2091 replies to the operating system with a voice-control completion reply. The operating system 209, which has received the reply, replies to the audio device 1 with the voice-control completion reply through the host interface 207.

The control unit 107 monitors reception of the voice-control completion reply (step 2012). If the control unit 107 receives the voice-control completion reply, the control unit 107 returns the display of the display device 102 to the display before the display of the voice-input reception screen (step 2014).

Then, a timer having a predetermined time-out period (for example, five seconds) is started (step 2016). The playback state of the player application 210 of the portable player 2 is monitored (step 2018, 2020), until start of the playback operation of the player application 210 of the portable player 2 is detected (step 2022) or until the time-out of the timer occurs (step 2024).

The playback state of the player application 210 of the portable player 2 is monitored by repeating processing of transmitting a playback-state query to the portable player 2 through the device interface 106 (step 2018) and receiving a playback-state reply for the query (step 2020).

If the operating system 209 of the portable player 2 receives the playback-state query from the audio device 1, the operating system 209 acquires the current playback state of the player application 210, and transmits the playback state as a playback-state reply to the audio device 1 through the host interface 207. The playback state to be replied as the playback-state reply contains playback/non-playback of the audio data of the audio file of the player application 210, a playback time position of the current audio data during playback (an elapsed time since a playback time at the beginning of the audio data), and identification of the audio file during playback.

Also, the start of the playback operation of the player application 210 of the portable player 2 is detected in step 2022 by detecting the start of the playback operation of the player application 210 of the portable player 2 when the playback state expressed by the playback-state reply received in step 2020 is changed from "non-playback of audio data" to "playback of audio data."

If the time-out of the timer occurs (step 2024), the processing returns to the processing from step 2002.

If the start of the playback operation of the player application 210 of the portable player 2 is detected (step 2022) before the time-out of the timer occurs (step 2024), it is checked whether the currently used audio source is the portable player 2 or not (step 2026). If the currently used audio source is the portable player 2, the processing returns to the processing from step 2002.

In contrast, when the start of the playback operation of the player application 210 of the portable player 2 is detected (step 2022) before the time-out of the timer occurs (step 2024), if the currently used audio source is not the portable player 2 (step 2026), the currently used audio source is changed to the portable player 2 (step 2028).

Then, a cue command (a command for searching the beginning) of the playback audio data is transmitted to the portable player 2 through the device interface 106 (step 2030), and the processing returns to the processing at step 2002.

In this case, the operating system 209 of the portable player 2, which has received the cue command from the audio device 1 through the host interface 207 causes the player application 210 to start playback from the beginning of the audio data during playback by controlling the playback time position of the audio data of the player application 210 to the beginning of the audio data during playback.

The control voice reception processing performed by the control unit 107 has been described above.

Step 2030 of the control voice reception processing may be processing of transmitting a playback-time-position change command for returning the playback time position toward the past for a predetermined period, to the portable player 2. In this case, the operating system 209 of the portable player 2, which has received the playback-time-position change command from the audio device 1, causes the player application 210 to start playback from a playback time position before the current playback time position of the audio data during playback for the predetermined period, by performing the control of shifting the playback time position of the audio data of the player application 210 toward the past for the predetermined period. This predetermined period may be a time corresponding to a playback time position indicated by a playback state expressed by a playback-state reply received last time, or may be a time expected as an elapsed time since a time at which playback of the player application 210 of the portable player 2, the start of which is previously determined and detected in step 424, is actually started, to the current point. Even with this configuration, the playback time position of the audio data of the player application 210 can be shifted to the beginning of the audio data during playback.

An operation example of the above-described control voice reception processing is described below.

As shown in FIG. 3, in a state in which playback is not performed by the audio application of the portable player 2, when a voice-control request operation (301) is performed by a user, the audio device 1 transmits a voice-control-function activation request (302) to the portable player 2. The portable player 2, which has received the voice-control-function activation request (302) activates the voice recognition client 2091 (303), and replies to the audio device 1 with a voice-control-function effective reply (304).

The audio device 1, which has received the voice-control-function effective reply (304), displays a voice-input reception screen (305), and urges the user to generate voice.

If the user generates voice for requesting playback (for example, "start playback") (306), the audio device 1 transfers voice data (307) of the generated voice to the portable player 2. The portable player 2, which has received the transfer of the voice data, performs voice recognition (308) of the transferred voice data. When the voice recognition is completed, the portable player 2 transmits a voice-control completion reply (309) to the audio device 1. Also, since the content of the voice data as the result of the voice recognition is the request for playback, the portable player 2 starts control for the start of playback of the player application 210 (310).

The audio device 1, which has received the voice-control completion reply (309), returns the display of the display device 102 to a display before the display of the voice-input reception screen (310), and starts the timer (311).

Then, the audio device 1 starts monitoring (312) of the playback state of the player application 210 of the portable player 2. The audio device 1 repeats transmission of a playback-state query (41, 43, 45), and reception of a playback-state reply (42, 44, 46).

If the portable player 2 starts playback of an audio file of a song X of the player application 210 (313) by the control (310), the portable player 2 changes the playback state expressed by the playback-state reply from "non-playback" (42, 44) to "playback" (46). Then, the audio device 1, during the monitoring (312), detects the start of the playback operation of the player application 210 of the portable player 2 (47) by the change from "non-playback" to "playback" of the playback state expressed by the playback-state reply.

If the start of the playback operation is detected, and if the currently used audio source is not the portable player 2, the audio device 1 changes the currently used audio source to the portable player 2 (314). Consequently, the sound of the audio data output from the portable player 2 is output from the speaker 104 of the audio device 1.

Then, the audio device 1 transmits a cue command (315) to the portable player 2. The player application 210 of the portable player 2, which has received the cue command (315) from the audio device 1, shifts the playback position of the audio data of the song X during playback to the beginning (316), and starts playback from the beginning of the song X.

Consequently, the audio data from the beginning of the song X is output from the portable player 2 to the audio device 1 (317). The sound from the beginning of the song X is output from the speaker 104 of the audio device 1 (318).

If the voice (306) generated by the user is not the voice for requesting playback, during the monitoring (312), the change from "non-playback" to "playback" of the playback state expressed by the playback-state reply does not occur, and the start of the playback operation is not detected. During the monitoring (312), the time-out of the started timer (311) occurs, the currently used audio source is not changed, and the sound output state of the audio device 1 is maintained in a state at the time of the generation of the voice-control request operation (301).

Also, when the user performs the voice-control request operation (301), even if the playback state of the portable player 2 is "playback," the playback state expressed by the playback-state reply is not changed from "non-playback" to "playback" during the monitoring (312), and the start of the playback operation is not detected. During the monitoring (312), the time-out of the started timer (311) occurs, the currently used audio source is not changed, and the setting of the currently used audio source is maintained in a state at the time of the generation of the voice-control request operation (301).

An embodiment of the invention has been described. As described above, with this embodiment, in the audio device 1, the output of the playback sound of the portable player 2 to the user can be properly started in the audio device 1 only when the received voice generated by the user is for performing voice control for starting playback of the portable player 2. Also, the playback sound of the portable player 2 may be output to the user by the audio device 1 from the beginning of the song. Accordingly, the audio device 1 can perform an operation that matches the control content by the voice control of the portable player 2.

In the control voice reception processing in the above-described embodiment, the portable player 2 starts monitoring of the playback state of the player application 210 of the portable player 2 for the predetermined period after the voice-control completion reply is received, with regard to that it takes a time of about several seconds after the voice recognition of the voice for requesting the playback until the playback is started. However, if the portable player 2 starts the playback immediately after the voice recognition of the voice for requesting the playback, the start of the playback operation of the player application 210 of the portable player 2 may be detected as follows. That is, in step 2010, before the voice data is transferred to the portable player 2, the playback-state query is transmitted to the portable player 2, and the playback state before the voice control is detected from the playback-state reply provided from the portable player 2. If the detected playback state before the voice control is "playback," the display state returns (step 2014) in response to the reception of the voice-control completion reply (step 2012), and the processing returns to the processing from step 2002. In contrast, if the detected playback state before the voice control is "non-playback," the display state returns (step 2014) in response to the reception of the voice-control completion reply (step 2012), then the processing goes to step 2016 and later, and the monitoring of the playback state of the player application 210 of the portable player 2 for the predetermined period is started (steps 2016-2024). In step 2022, if the playback state reply expressing the playback state indicating "playback" is received within the predetermined period, the start of the playback operation of the player application 210 of the portable player 2 is detected, and the processing goes to step 2026.

In the above-described embodiment, audio is played back by the voice control. However, even in a case in which the portable player 2 plays back video by voice control, the audio device 1 may be applied if the audio device 1 serves as an audiovisual (AV) device that performs an operation of the audio device 1 by replacing audio with video.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An audio device, a portable player being connectable to the audio device, the portable player being controllable by voice control, the audio device comprising:
   a sound output unit that outputs sound, the sound source of which is a currently used audio source;
   a source selection unit that selectively sets one of a plurality of audio source devices as the currently used audio source;
   a microphone; and
   a control voice processing unit,
   wherein, if the portable player is connected, the source selection unit causes the portable player to be included in the plurality of audio source devices as one of the audio source devices, and selectively sets one of the plurality of audio source devices including the portable player as the currently used audio source,
   wherein, if the portable player is set as the currently used audio source, the sound output unit outputs sound to be transferred to the audio device from the portable player, and
   wherein the control voice processing unit,
      if the portable player is connected, transfers voice data of generated voice input from the microphone to the portable player, and causes the portable player to perform voice control by the voice of the voice data transferred to the portable player, and
      acquires a state of the portable player after the voice control is performed from the portable player, determines whether or not a playback operation of the portable player is started by the voice control, and if the playback operation of the portable player is started by the voice control, causes the source selection unit to set the portable player as the currently used audio source, whereas if the voice control does not start the playback operation of the portable player, the currently used audio source is not changed.

2. The audio device according to claim 1, wherein the control voice processing unit acquires a playback state of the portable player as the state after the voice control is performed from the portable player, determines whether or not a playback operation of the portable player is started by the voice control, and if the playback operation of the portable player is started, causes the source selection unit to set the portable player as the currently used audio source.

3. The audio device according to claim 2, wherein the control voice processing unit determines that the playback operation of the portable player is started by the voice control if the playback operation of the portable player is started within a predetermined period after the control voice processing unit causes the portable player to perform the voice control.

4. The audio device according to claim 2, wherein the control voice processing unit determines that the playback operation of the portable player is started by the voice control if the playback state of the portable player is changed from non-playback to playback within a predetermined period after the control voice processing unit causes the portable player to perform the voice control.

5. The audio device according to claim 2, wherein the control voice processing unit controls start of playback of the portable player from the beginning of an audio content during playback by the portable player, if the playback operation of the portable player is started by the voice control.

6. The audio device according to claim 2, wherein the control voice processing unit controls the portable player to start playback of an audio content during playback by the portable player from a playback time position which is shifted by a predetermined time toward the beginning from a current playback time position of the audio content, if the playback operation of the portable player is started by the voice control.

7. A storage device storing a predetermined computer program that is read and executed by a computer including a microphone, a portable player being connectable to the computer, the portable player being controllable by voice control,
wherein the computer program causes the computer to function as
a sound output unit that outputs sound, the sound source of which is a currently used audio source,
a source selection unit that selectively sets one of a plurality of audio source devices as the currently used audio source, and
a control voice processing unit,
wherein, if the portable player is connected, the source selection unit causes the portable player to be included in the plurality of audio source devices as one of the audio source devices, and selectively sets one of the plurality of audio source devices including the portable player as the currently used audio source,
wherein, if the portable player is set as the currently used audio source, the sound output unit outputs sound to be transferred to an audio device from the portable player, and
wherein the control voice processing unit,
if the portable player is connected, transfers voice data of generated voice input from the microphone to the portable player, and causes the portable player to perform voice control by the voice of the voice data transferred to the portable player, and
acquires a state of the portable player after the voice control is performed from the portable player, determines whether or not a playback operation of the portable player is started by the voice control, and if the playback operation of the portable player is started by the voice control, causes the source selection unit to set the portable player as the currently used audio source, whereas if the voice control does not start the playback operation of the portable player, the currently used audio source is not changed.

8. The storage device storing the computer program according to claim 7, wherein the control voice processing unit acquires a playback state of the portable player as the state after the voice control is performed from the portable player, determines whether or not a playback operation of the portable player is started by the voice control, and if the playback operation of the portable player is started, causes the source selection unit to set the portable player as the currently used audio source.

9. The storage device storing the computer program according to claim 8, wherein the control voice processing unit determines that the playback operation of the portable player is started by the voice control if the playback operation of the portable player is started within a predetermined period after the control voice processing unit causes the portable player to perform the voice control.

10. The storage device storing the computer program according to claim 8, wherein the control voice processing unit determines that the playback operation of the portable player is started by the voice control if the playback state of the portable player is changed from non-playback to playback within a predetermined period after the control voice processing unit causes the portable player to perform the voice control.

11. The storage device storing the computer program according to claim 8, wherein the control voice processing unit controls start of playback of the portable player from the beginning of an audio content during playback by the portable player, if the playback operation of the portable player is started by the voice control.

12. The storage device storing the computer program according to claim 8, wherein the control voice processing unit controls the portable player to start playback of an audio content during playback by the portable player from a playback time position which is shifted by a predetermined time toward the beginning from a current playback time position of the audio content, if the playback operation of the portable player is started by the voice control.

13. A storage device storing a predetermined computer program that is read and executed by a computer including a microphone, a portable player being connectable to the computer, the portable player being controllable by voice control,
wherein the computer program causes the computer to function as
a content output unit that outputs a content, the source of which is a currently used content source,
a source selection unit that selectively sets one of a plurality of content source devices as the currently used content source, and
a control voice processing unit,
wherein, if the portable player is connected, the source selection unit causes the portable player to be included in the plurality of content source devices as one of the content source devices, and selectively sets one of the plurality of content source devices including the portable player as the currently used content source,
wherein, if the portable player is set as the currently used content source, the content output unit outputs a content to be transferred to the content output device from the portable player, and
wherein the control voice processing unit,
if the portable player is connected, transfers voice data of generated voice input from the microphone to the portable player, and causes the portable player to perform voice control by the voice of the voice data transferred to the portable player, and
acquires a playback state of the portable player as a state after the voice control is performed from the portable player, determines whether or not a playback operation of the portable player is started by the voice control, and if the playback operation of the portable player is started by the voice control, causes the source selection unit to set the portable player as the currently used content source, whereas if the voice control does not start the playback operation of the portable player, the currently used audio source is not changed.

14. The storage device storing the computer program according to claim 13, wherein the content is a video content.

* * * * *